M. MacFARLAND.
STARTING DEVICE FOR EXPLOSIVE ENGINES.
APPLICATION FILED SEPT. 11, 1912.
1,089,568.
Patented Mar. 10, 1914.
2 SHEETS—SHEET 1.
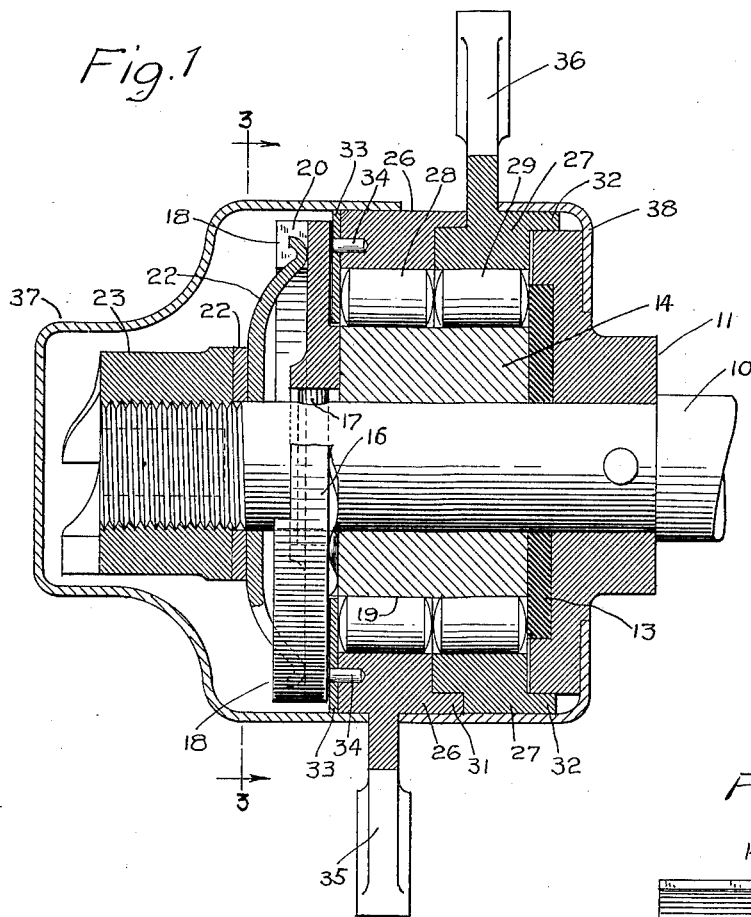
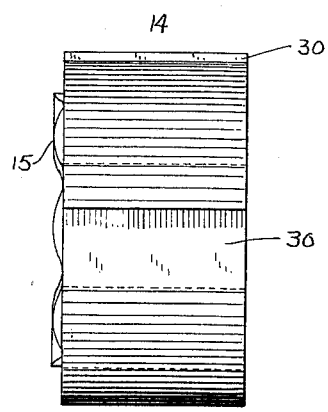
WITNESSES:
H. W. Meade
E. M. Culver
INVENTOR
Merle MacFarland
BY
A. M. Wooster
ATTORNEY

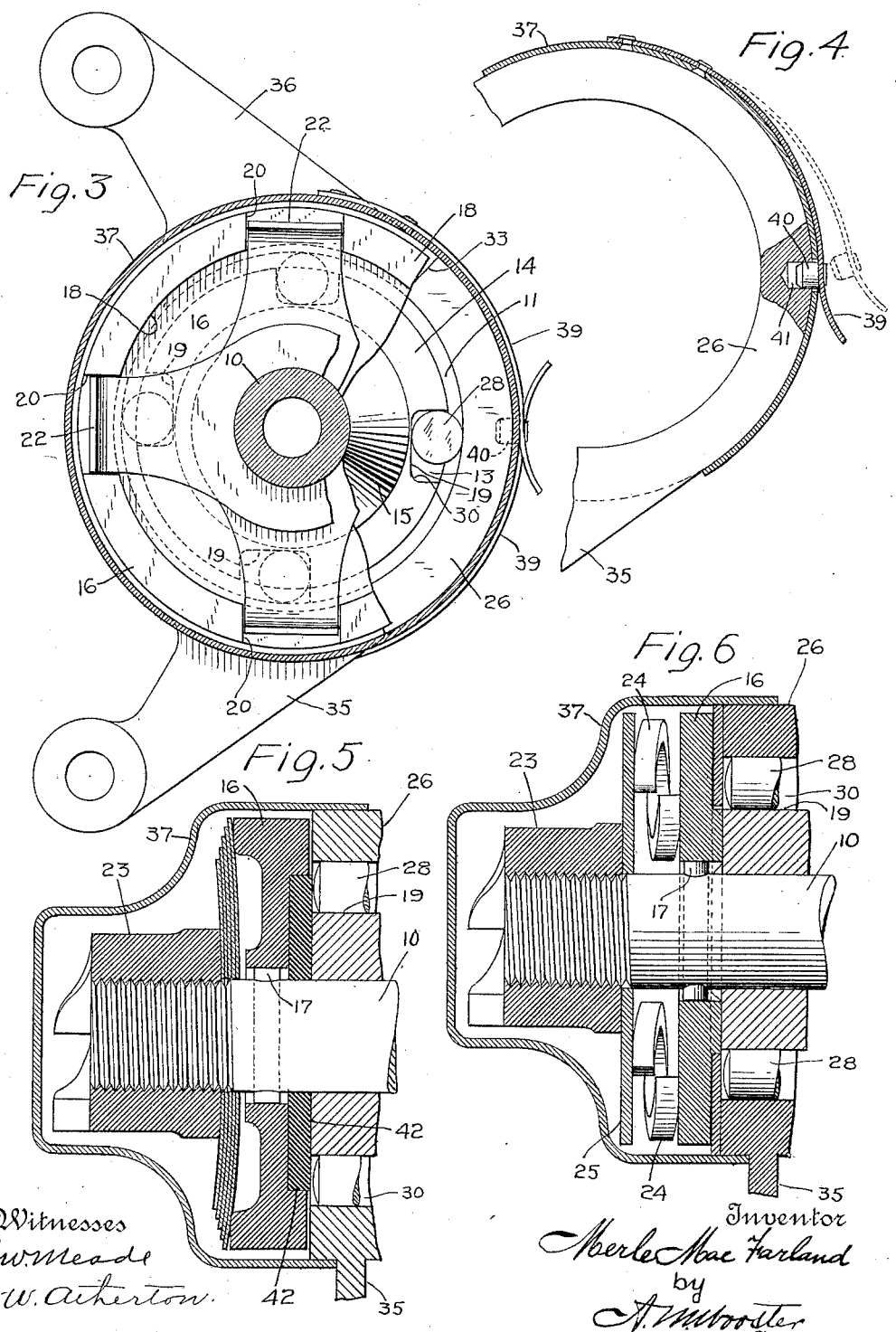

UNITED STATES PATENT OFFICE.

MERLE MacFARLAND, OF MAPLEWOOD, NEW JERSEY, ASSIGNOR TO COLUMBIA NUT AND BOLT COMPANY, INCORPORATED, OF BRIDGEPORT, CONNECTICUT, A CORPORATION OF NEW YORK.

STARTING DEVICE FOR EXPLOSIVE-ENGINES.

1,089,568. Specification of Letters Patent. Patented Mar. 10, 1914.

Application filed September 11, 1912. Serial No. 719,747.

*To all whom it may concern:*

Be it known that I, MERLE MACFARLAND, a citizen of the United States, residing at Maplewood, county of Essex, State of New Jersey, have invented an Improvement in Starting Devices for Explosive-Engines, of which the following is a specification.

This invention has for its object to provide a simple and inexpensive starting mechanism for explosive engines which shall be easy to operate, not liable to get out of order and will be self-releasing should the engine back-fire.

With these and other objects in view the invention consists in the novel constructions and combinations of parts which I will now describe referring to the accompanying drawing forming a part of this specification and using reference characters to indicate the several parts.

Figure 1 is a longitudinal section of my novel starting mechanism, the sliding disk being partly in elevation; Fig. 2 a side elevation of the driving member detached; Fig. 3 an elevation partly broken away, as seen from the left in Fig. 1, the shaft and dust cap being in section on the line 3—3; Fig. 4 a detail view of a driving ring and dust cap, showing a mode of attaching the cap to the ring; and Figs. 5 and 6 are views corresponding with Fig. 1, illustrating modifications in the details of construction.

10 denotes an engine shaft or an extension thereof, 11 a driven member rigidly secured thereto, 13 a friction washer shown in the present instance as lying in and projecting from a recess in the face of the driven member and 14 a driving member mounted on the shaft adjacent to the friction washer, but free to rotate independently thereof. The driving member is provided at one end with radial corrugations 15 (see Fig. 2) which are engaged by corresponding corrugations on the inner face of a sliding disk 16 which is held against rotation independently of the shaft, as by means of a pin 17, but is free to slide longitudinally. The sliding disk is provided with a flange 18 having slots 20 formed in its face and is held in yielding engagement with the driving member by means of springs 22 which lie intermediate the disk and a tension nut 23 which has threaded engagement with the end of the shaft. The springs lie at right angles to each other and engage the slots in the disk flange whereby they are retained in place. It is obvious that turning the tension nut inward will increase the tension of the springs and will force the sliding disk against the driving member and cause the latter to crowd the friction washer against the driven member. In practice the springs are made strong enough to frictionally bind the parts together, so that when the driving member is rotated the driven member and shaft will be carried with it. If preferred, a spring consisting of a series of leaves blanked out from sheet metal may be used. This form is illustrated in Fig. 5 and shows the inner leaf of the spring as bearing against the face of the disk, no slots being necessary. In Fig. 6 I have illustrated a form in which spiral springs 24 are used, the coils lying intermediate the disk and a circular plate 25 which receives the thrust of the tension nut. The tension nut is turned inward as before to increase the tension of the coils, as will be readily understood by referring to the drawing. The driving member receives motion from driving rings 26 and 27, mounted to oscillate exteriorly thereof, and sets of rolls 28 and 29 which lie intermediate the driving rings and the driving member in recesses 30 in the periphery of the driving member. It will be noted that the recesses are slightly deeper at their rear ends (that is, in a counter-clock-wise direction) than at their forward ends, thereby forming inclines 19 upon which the rolls travel, as will presently be explained. In order to exclude dust and retain the lubricant I have shown driving ring 26 as provided with a flange 31 which overlies a reduced portion of driving ring 27, and driving ring 27 as provided with a flange 32 which overlies driven member 11.

33 denotes a metallic washer secured, as by pins 34, to the outer face of driving ring 26, and acting to retain the rolls in driving ring 26 out of contact with the sliding disk. In practice the ends of the rolls contact lightly, if at all, with each other and with the retaining washer and driven member. It will be noted that the retaining washer has no frictional engagement with the sliding disk, so that the entire pressure of the springs is exerted upon the driving member.

Driving ring 26 is provided with an arm 35 and driving ring 27 is provided with an arm 36. These arms in use are moved in the same direction simultaneously in any suitable manner, as by means of links and a starting lever (not shown.)

37 and 38 denote front and rear dust caps carried respectively by driving rings 26 and 27, which inclose the mechanism and have slots in their edges through which the arms project. These dust caps are secured to the driving rings by means of spring latches 39, one end of each latch being riveted to a dust cap as shown and the opposite end provided with a lug 40 which is adapted to pass through a hole in the cap and engage a recess in a driving ring. It will be noted that the ends of the latches having the lugs are curved outward for convenience in disengaging the lugs from the recesses when it is required to remove a dust cap.

The rolls lie between the inner walls of the driving rings and the inclines and when oscillatory motion is communicated to the driving rings, one of said rings will, by frictional engagement with the corresponding set of rolls, cause said rolls to travel up the inclines and wedge between the driving ring and the driving member and thus impart forward rotation to the driving member. It will be noted that the driving rings are wholly independent of each other, one acting to carry the driving member forward, while the other is freely moving backward, backward rotation of course causing the rolls to move backward into the deep portions of the recesses. The instant the engine starts, the shaft will cause the driving member to rotate faster than the operative driving ring, which will disconnect the driving member therefrom, the rolls dropping back into the deep portions of the recesses and leaving the parts in the position shown in Fig. 1. Should the engine back-fire, the effect of which is a sharp blow as compared with the relatively slow movement required to start an engine, the shaft will be suddenly driven backward carrying the driven member and the sliding disk with it, but the driving member is prevented from moving backward with them because of the applied starting pressure which tends to move it forward. The springs now yield and permit the corrugations on the inner face of the sliding disk to slip over the corresponding corrugations on the outer face of the driving member. It will be noted from the above that an engine when normally running will carry the shaft, driven member, driving member, sliding disk and springs forward as a unit, the driving rings of course being disconnected as the rolls are left in the deeper portions of the recesses in the driving member. Should the engine back-fire, however, and the shaft be driven backward, the driving member will be held against backward rotation by the operative driving ring because of the rolls traveling up the inclines and locking said member to the ring, but the driven member, sliding disk and springs will be carried backward with the shaft, the springs allowing the corrugations on the sliding disk to ride over the corrugations of the driving member. In other words, while the driving member is held stationary, the driven member and sliding disk are driven backward by the engine shaft.

I have shown the tension nut as provided with ratchet teeth for convenience in cranking up in case of accident to the starting mechanism. The front latch is sprung outward, and dust cap removed and a crank having an extension adapted to engage a hole in the end of the shaft is used in the ordinary manner.

In the modified form illustrated in Fig. 5, the corrugations on the sliding disk and driving member are dispensed with and in lieu thereof I have shown a friction washer 42 socketed in the sliding disk and adapted to be forced against the driving member by the springs, thereby yieldingly locking the sliding disk and driving member together by frictional engagement. Washer 42 in this form also performs the function of washer 33 in the other form and retains the rolls against endwise displacement.

Having thus described my invention I claim:

1. Starting mechanism comprising a driving member having peripheral recesses with inclines, driving rings outside the driving member, rolls between the inclines and the rings, a driven member, a friction washer between said members and yielding means bearing against the driving member for locking the driving and driven members together by frictional engagement.

2. Starting mechanism comprising a driving member having peripheral recesses with inclines, driving rings outside the driving member, rolls between the inclines and the rings, a driven member, a friction washer between said members, a sliding disk adapted to bear against the driving member, a washer between the rolls and the disk and springs bearing against the disk whereby the driving and driven members are locked together by frictional engagement.

3. Starting mechanism comprising a driving member having peripheral recesses with inclines, driving rings outside the driving member, rolls between the inclines and the rings, a driven member, a friction washer between said members, a sliding disk adapted to bear against the driving member and having a slotted flange on one face and springs bearing against the disk and retained in place by the slots, substantially as described, for the purpose specified.

4. Starting mechanism comprising a driving member having peripheral recesses with inclines, driving rings outside the driving member, rolls between the inclines and the rings, a driven member, a friction washer between said members, means for retaining the rolls against endwise displacement and yielding means for locking the members together by frictional engagement.

5. Starting mechanism comprising a driving member having peripheral recesses with inclines, driving rings outside the driving member, rolls between the inclines and the rings, a driven member, a sliding disk adapted to bear against the driving member and a spring bearing against the disk and acting to lock the members together by frictional engagement.

6. Starting mechanism comprising a driving member having radial corrugations at one end and peripheral recesses with inclines, driving rings outside the driving member, rolls between the inclines and the rings, a driven member contiguous to the driving member, a sliding disk adapted to engage the driving member and a spring bearing on the disk and acting to lock the members together by frictional engagement.

7. Starting mechanism comprising a driving member having peripheral recesses with inclines, driving rings outside the driving member, rolls between the inclines and the rings, a driven member, a friction washer between said members, a sliding disk adapted to engage the driving member, a spring bearing against the disk, for the purpose set forth and means for regulating the tension of the spring.

8. Starting mechanism comprising a driving member having peripheral recesses with inclines, driving rings outside the driving member, rolls between the inclines and the rings, a driven member, a friction washer between said members, yielding means bearing against the driving member, for the purpose set forth and detachable dust caps carried by the driving rings and inclosing the mechanism.

9. Starting mechanism comprising a driving member having peripheral recesses with inclines, driving rings outside the driving member and provided with recesses, rolls between the inclines and the rings, a driven member contiguous to the driving member, yielding means engaging the driving member for locking the members together by frictional engagement, dust caps carried by the rings and spring latches secured to the dust caps and having lugs passing through the caps and engaging the recesses in the rings.

10. Starting mechanism comprising a driving member having radial corrugations, a driven member, a sliding disk having corrugations corresponding with the driving member, and yielding means acting on the sliding disk to cause said disk to crowd the driving member against the driven member, for the purpose set forth.

11. In combination with an engine shaft, starting mechanism comprising a driving member mounted on the shaft but free to rotate independently thereof and having peripheral recesses with inclines, driving rings outside the driving member, rolls between the inclines and the rings, a driven member secured to the shaft and yielding means bearing against the driving member for normally locking the driving and driven members together by frictional engagement.

12. In combination with an engine shaft, starting mechanism comprising a driven member secured to the shaft, a driving member mounted freely on the shaft and provided with radial corrugations, a sliding disk having corresponding corrugations and which rotates with the shaft but is free to slide longitudinally thereon, and a spring bearing against said disk, whereby the driving and driven members are normally locked together by frictional engagement.

13. In combination with an engine shaft, starting mechanism comprising a driving member having peripheral recesses with inclines, and which is mounted on the shaft but free to rotate independently thereof, driving rings outside the driving member, rolls between the inclines and the rings, a driven member secured to the shaft, a friction washer between said members and yielding means bearing against the driving member to cause said member to crowd the friction washer against the driven member, for the purpose set forth.

In testimony whereof I affix my signature in presence of two witnesses.

MERLE MacFARLAND.

Witnesses:
A. M. WOOSTER,
S. W. ATHERTON.